Nov. 22, 1960
J. F. HAUCK
2,961,543
MONITORING APPARATUS FOR RADIOACTIVE
EFFLUENTS FROM NUCLEAR REACTORS
Filed April 8, 1957
4 Sheets-Sheet 1
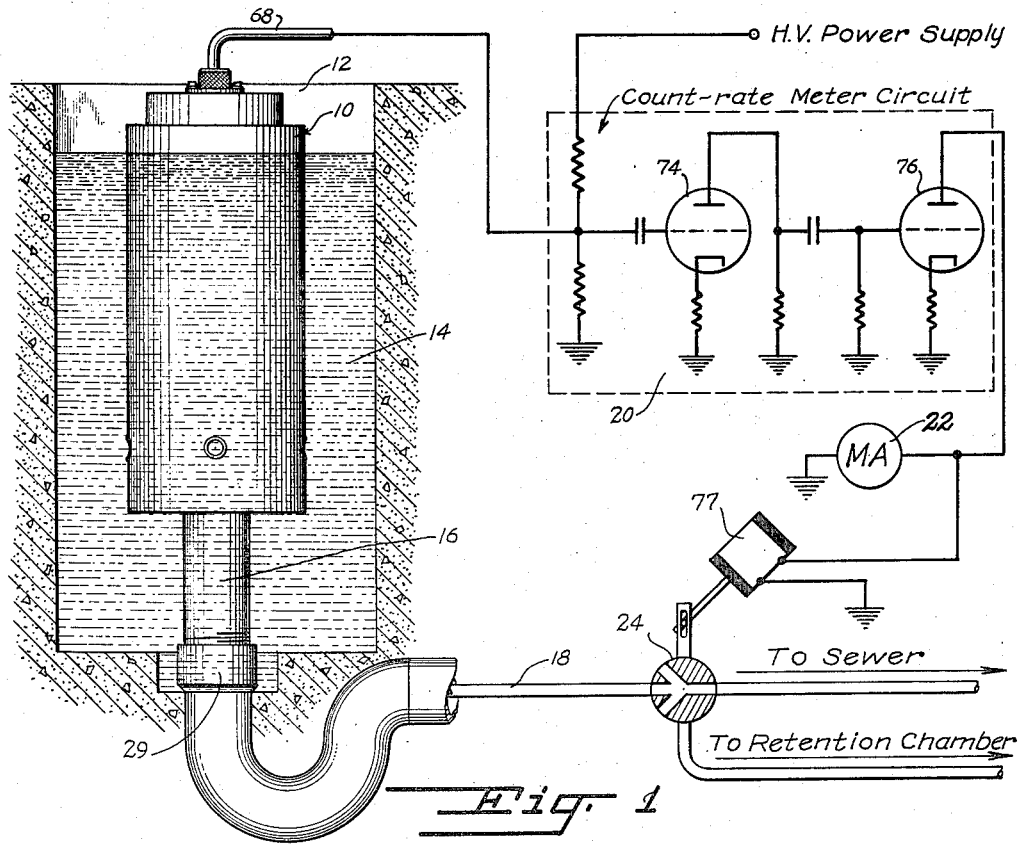
Fig. 1
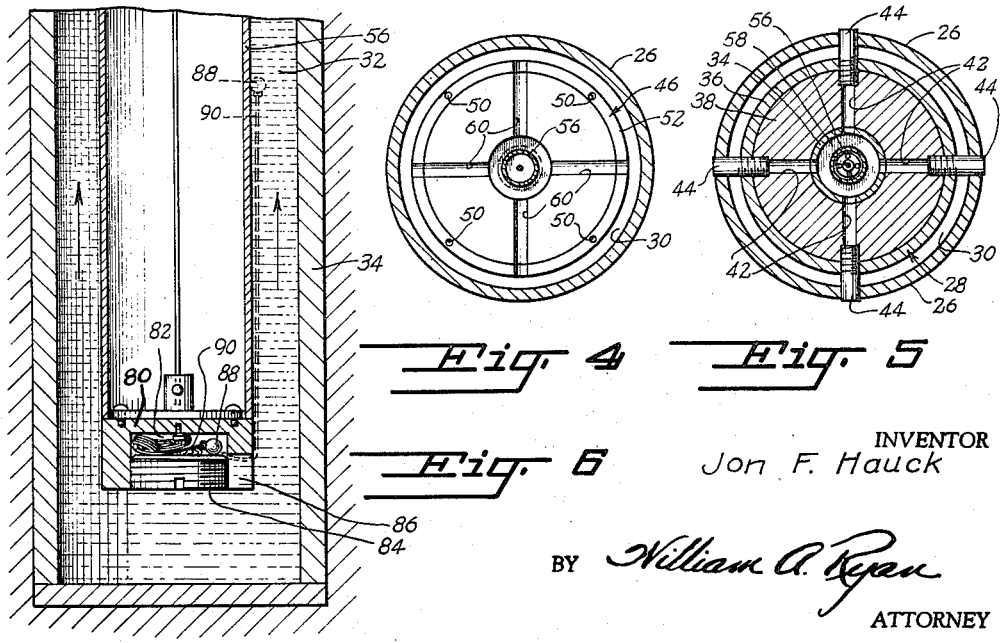
Fig. 4  Fig. 5
Fig. 6
INVENTOR
Jon F. Hauck
BY *William A. Ryan*
ATTORNEY Nov. 22, 1960

J. F. HAUCK 2,961,543

MONITORING APPARATUS FOR RADIOACTIVE
EFFLUENTS FROM NUCLEAR REACTORS

Filed April 8, 1957

INVENTOR
Jon F. Hauck

BY *William A. Ryan*

ATTORNEY

Nov. 22, 1960
J. F. HAUCK
2,961,543
MONITORING APPARATUS FOR RADIOACTIVE
EFFLUENTS FROM NUCLEAR REACTORS
Filed April 8, 1957
4 Sheets-Sheet 3
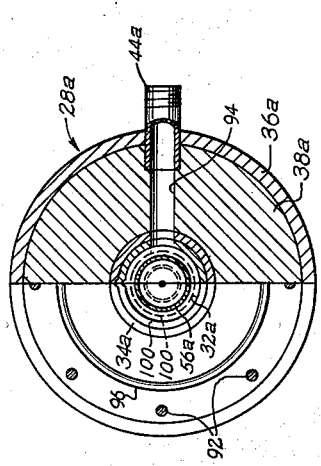
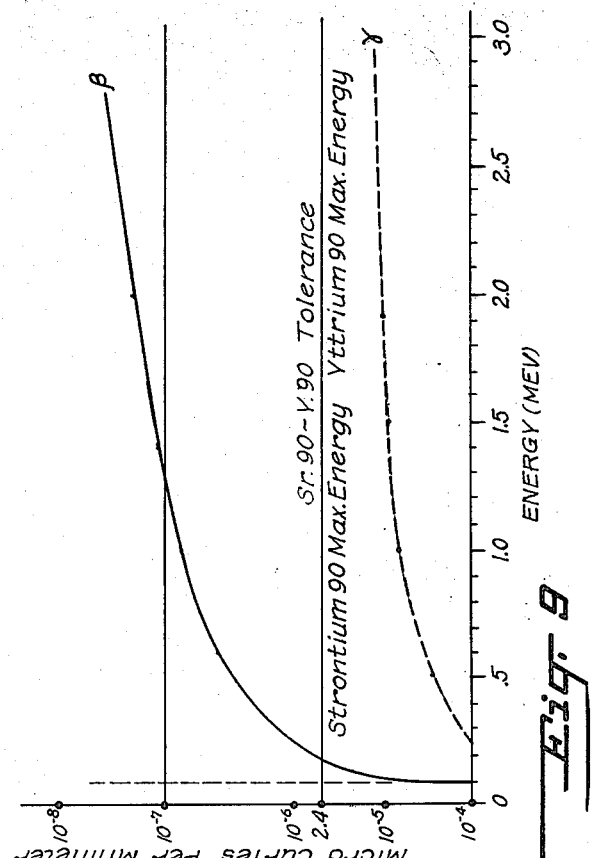
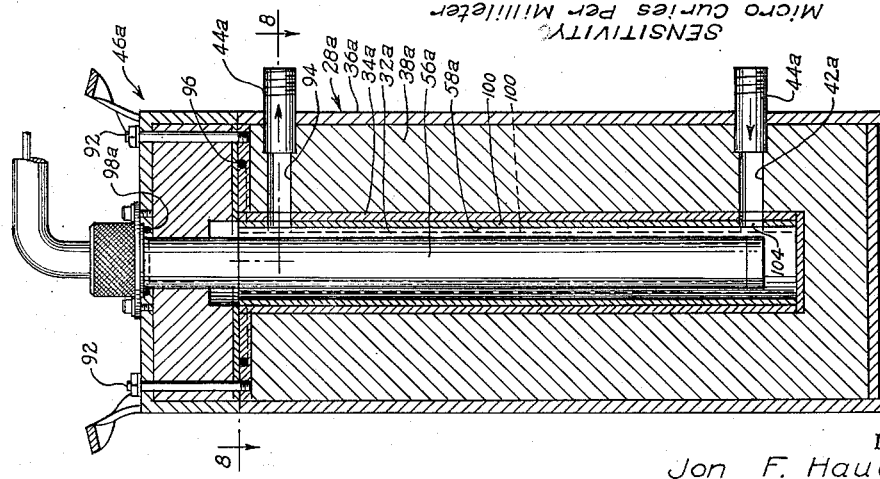
INVENTOR
Jon F. Hauck
BY *William A. Ryan*
ATTORNEY Nov. 22, 1960

J. F. HAUCK 2,961,543

MONITORING APPARATUS FOR RADIOACTIVE
EFFLUENTS FROM NUCLEAR REACTORS

Filed April 8, 1957

INVENTOR
Jon F. Hauck

BY *William A. Ryan*
ATTORNEY

United States Patent Office 2,961,543
Patented Nov. 22, 1960

2,961,543

MONITORING APPARATUS FOR RADIOACTIVE EFFLUENTS FROM NUCLEAR REACTORS

Jon F. Hauck, Langley Park, Md., assignor, by mesne assignments, to Allis-Chalmers Manufacturing Company, a corporation of Delaware Filed Apr. 8, 1957, Ser. No. 651,421

10 Claims. (Cl. 250—83.6)

This invention generally relates to nuclear reactors and more particularly to a monitoring apparatus for continuously recording and controlling the degree of isotopic contamination of water effluents and other radioactive fluids.

Heretofore no existing systems have been developed for beta-gamma measurement which would effectively measure all isotopes or which could be effectively calibrated for the degree of concentration of radioactivity. It is, therefore, one object of this invention to provide a monitor which will effectively measure radioactivity of effluents with sufficient sensitivity to conform with the A.E.C. regulations for isotope concentrations relating to continuous disposal into public sewerage systems.

A further object of the invention is to develop a monitoring assembly which is versatile to the extent that it can be used to measure either gross concentration of mixed isotopes or specific isotopes alone.

It is a further object of this invention to provide a universal isotope determining system for water effluents.

Another object of the invention is to provide a monitoring device primarily for use in nuclear reactors, wherein the monitoring assembly can be wholly removed for cleaning, repair or replacement and in addition the elements of the monitoring mechanism are separable to permit substitution and replacement to modify its calibrating characteristics or counting volume.

Another object is to provide means for testing and calibrating procedures coincident with the use of the assembly.

More specifically the present invention comprehends the use of concentrically arranged cylindrical parts to insure uniform shielding throughout the assembly, uniform and uninterrupted flow of the effluent, and convenient arrangement and association of parts permitting their removal, substitution and interchange while maintaining their predetermined association.

These and further objects of the invention will more clearly hereinafter appear by reference to the accompanying drawings forming a part of the instant specification, wherein like characters of reference designate corresponding parts throughout the several views, in which:

Fig. 1 is an elevation of one form of monitoring assembly with diagrammatic view of the control;

Fig. 4 is a section on line 4—4 of Fig. 3;

Fig. 5 is a section on line 5—5 of Fig. 3;

Fig. 6 is an enlarged fragmentary sectional view illustrating the calibrating element;

Fig. 7 is a vertical section through a modified form of monitor;

Fig. 8 is a section on line 8—8 of Fig. 7;

Fig. 9 is a graph of sensitivity versus energy;

Figures 2, 3:
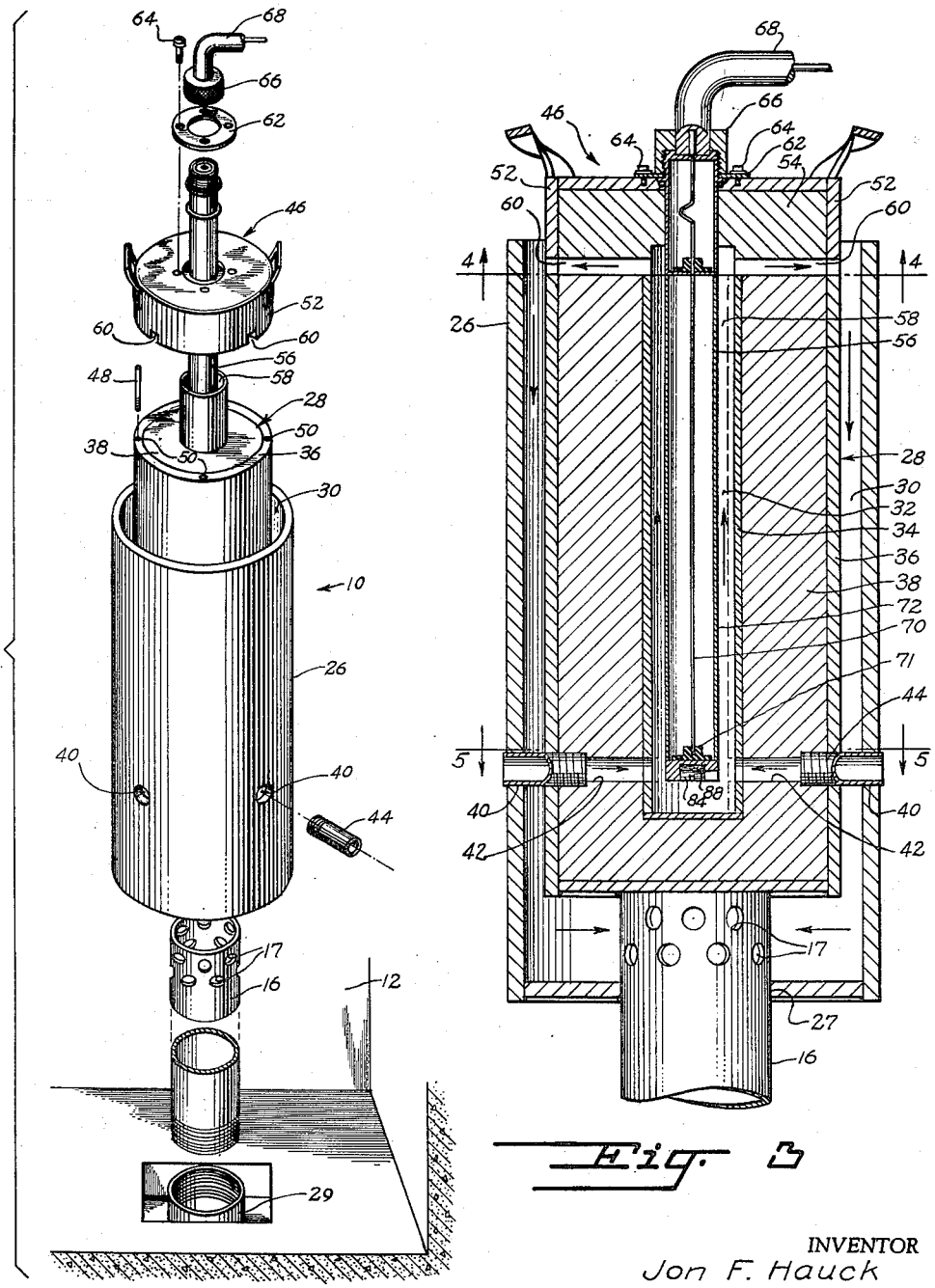
Fig. 2 is an exploded view of the monitor of Fig. 1.
Fig. 3 is a vertical section through the assembled device.

It is well known in the field of nuclear reactors and nuclear research facilities generally that various fluids, such as the moderator, primary coolant, secondary coolant, fluid shields, etc., become contaminated by reason of their proximity to the fuel elements and other energy radiating sources. That is to say, the radiations such as beta particles and gamma rays occurring as a result of the fission process or as the direct result of a primary radioactive source cause these surrounding fluid media to become radioactive, in that various radioactive isotopes are produced and contained in such media. It is also well known that such radioactive isotopes in the fluid are dangerous to any form of life within the vicinity of such radioactive fluids such that extensive safety measures and precautions must be taken to minimize and eliminate the deleterious effects of prolonged proximity to or contact with such radioactive sources. It is for this reason that various safety standards and regulations have been prescribed for persons working in the vicinity of radioactive materials and other regulations have been prescribed for the disposal of the waste products incident with nuclear activity. The initial step to be taken in establishing a safety program is to determine the degree of concentration of radioactive isotopes in the liquid media by quantitatively measuring such radioactive isotopic concentrations. There are many such quantitative measuring devices such as the Geiger-Müller counter and the like which will provide information of the radioactive isotopic concentration sufficient to allow subsequent safety measures to be taken.

One specific area where it is necessary to determine radioactive isotopic concentration, and which is the example chosen for the illustration of this invention, is in the cooling water passed over a nuclear reactor's cooling tower for removal of heat therefrom. This cooling water or effluent is usually discharged into a standard sewerage system, and it is this effluent which must be monitored before it may be safely discharged as sewage. The acceptable standard levels of radioactive concentration have been set forth by the United States Atomic Energy Commission as published in the Federal Register, Doc. 57–511, January 25, 1957, and which regulations establish the conditions and criteria to which this invention is directed, all of which may be appreciated from a consideration of the following disclosure of one embodiment of this invention.

Considering Fig. 1, the present invention is illustrated generally in that the monitoring apparatus 10 is shown in a floor drain basin or sump 12 wherein the drain water 14 surrounds the water monitoring apparatus 10 and will pass through such apparatus to enable the radioactive isotopic concentration of such water to be detected before its passing to the outlet conduit 16 and discharge piping 18 for ultimate disposal to the sewer, or to a retention chamber should the radioactivity of such water effluent 14 be found to be in excess of the safe minimum standards, as illustrated in the graph of Fig. 9, set for permissible sewerage discharge. The radioactivity detection information as determined within the monitoring apparatus 10 is transferred electrically to the count-rate meter circuit shown generally at 20 where such information may be visually recorded as by the meter 22 and further may be used to actuate a valve 24 to change the ultimate destination of the effluent, all of which will be hereinafter more fully described.

The structure of one embodiment of the monitoring apparatus 10 may be seen in Figs. 2 and 3, wherein such apparatus includes a cylindrical housing 26 of stainless steel or the like, having an opening 27 in the bottom thereof to receive the outlet conduit 16, which has a separable fitting at 29 with the discharge piping 18. A tubular container 28, of stainless steel or the like, is positioned in and concentric with the housing 26 and rests on the top of the discharge conduit 16. The diameter of the container 28 is less than the innermost diameter of the housing 26 so that an annular outer passageway 30 is formed between the housing and the container. A cylindrical recess 32 is provided at the center of the container 28, and between the inner cylindrical wall 34, made of aluminum or the like, and the outer cylindrical wall 36, made of aluminum or the like, of the container 28 is placed any suitable shielding material 38, such as lead. A plurality of ports 40 in the wall of the housing 26 are located such that they will be adjacent to and contiguous with similar openings or ducts 42 in the container 28 and of such size as to receive threaded nipples 44 which will extend from outside the housing 26 across the outer passageway 30 to the ducts 42, thereby forming a continuous passageway to the recess 32 in the container 28, as can be more clearly seen in Fig. 5.

A cover 46 of stainless steel or the like is provided to rest on the outer wall 36 of the container 28 and is held in place by a plurality of guide pins 48 which are set into openings 50 in the outer wall 36 and which are received into similar, identically spaced openings in the outer wall 52 of the cover 46. The cover 46 is lined with suitable shielding material 54, such as lead, and further the cover has an opening in the center thereof adapted to receive the tubular detector cell 56 which will project through the cover, and when the cover is in place with reference to the container 28, such detector cell will project into the recess 32 in the container. The diameter of the recess 32 is larger than the extreme diameter of the detector cell 56 such that an annular inner passageway 58 will exist between the inner wall 34 of the container 28 and the detector cell 56. The cover 46 is provided with suitable cutouts or ducts 60 in the bottom thereof which will connect the inner passageway 58 with the outer passageway 30, as can be more clearly seen in Fig. 4.

The detector cell 56 is rigidly affixed to the bracket 62 which in turn is rigidly affixed to the cover 46 by fasteners 64 such as bolts or the like. The detector cell 46 is an elongated tubular element threaded at one end thereof to receive the knurl connector 66 attached to the coaxial cable 68 so that when the connector is in place the detector cell 56 is electrically connected with the count-rate meter circuit 20 (see Fig. 1). The detector cell 56 is designed for high voltage operation and has a properly fused anode 70 of tungsten or the like which extends along the axis of the detector cell where it is terminated in any suitable insulating material 71, such as a glass bead which prevents sparking or arcing over at the tip of the anode 70. The outer wall 72 of the detector cell 56 forms the cathode of the unit and is made of stainless steel or the like, which material will permit beta and gamma radiations to penetrate the detector cell. The space between the anode 70 and the cathode 72 is filled with any suitable ionizing gas such as argon with an ethyl alcohol content, or neon with a halogen gas content. Thus, when beta and gamma radiations penetrate the detector cell 56 the gas within is ionized and the resulting ions are attracted to the collecting anode, by reason of the applied field existing between anode and cathode. This ion flow will produce pulses at the collecting electrode which will be transmitted to the counting-rate meter circuit 20 of Fig. 1 where they are amplified by the tube 74 and integrated with respect to time by the integrating tube 76 which provides a reading for the meter 22 and sufficient energy to actuate the valve 24 by means of the solenoid 77 when the reading is in excess of safe amounts radioactive penetration of the detector cell 56.

It is a unique feature of this invention to provide a self contained testing unit for the detector cell 56 as appears in Fig. 6, wherein the bottom of the detector cell 56 is provided with a chamber 80 rigidly affixed thereto. The chamber 80 contains a recess 82, a screw plug 84 set into and removable from the recess and a cutout or opening 86 in the chamber 80. A small float 88, attached to a line 90 which in turn is rigidly affixed to the chamber 80, is contained within the recess 82 and which may be removed from such recess through the opening 86 so as to float in the liquid surrounding the detector cell 56 in the inner passageway 32 as illustrated by the dotted figure at the right-hand side of the detector cell in Fig. 6. The float 88 contains a small amount of a long half life substance such as strontium 90-yttrium 90 or any other pure beta emitter so that a uniform level radioactive emissive source is available for determining the accuracy of the detector cell or the associated counting-rate meter circuit when the float is in its free position. When the float 88 is no longer required it is returned to the recess 82 in the chamber 80 to be retained therein until it is necessary to test or calibrate the detector cell 56 and count-rate meter circuit 20 again. When the float 88 is returned to the recess 82 it no longer provides radioactive emission to the surrounding area by reason of the shielding material, such as lead or the like, which makes up the chamber 80 and the plug 84. That is to say, the float 88 is completely shielded when contained in the recess 82.

The structure of a second embodiment of this invention is illustrated in Fig. 7 and this embodiment is adapted for use with effluents that are passed through the monitoring apparatus under pressure. This embodiment includes similar elements to the first embodiment already described and these are marked with the subscript "a" after the original notations. Thus it can be seen that the container 28a is provided with an outer wall 36a, an inner wall 34a, a recess 32a in the container, suitable shielding material 38a between the inner and outer walls, a threaded nipple 44a projecting into the container 28a to connect with the passageway 42a and the recess 32a. A detector cell 56a projects through the cover 46a into the recess 32a when the cover is in place, and the minimum diameter of the inner wall 34a exceeds the diameter of the detector cell 56a so as to provide an inner passageway 58a between the detector cell and the inner wall. Because this embodiment will operate under pressure the cylindrical housing 26 is omitted and the discharge ducts 60 are replaced by a second passageway 94 identical to the first passageway 42a but axially displaced therefrom. The second passageway 94 is also illustrated in Fig. 8.

The cover 46a in Fig. 7 is rigidly affixed to the container 28a by suitable fasteners 92 such as nuts and bolts or the like. Because this embodiment is under pressure, an O ring seal 96 is provided in the top of the container 28a adjacent the cover 46a in order to provide a leak proof fitting between said cover and container. The O ring seal 96 as illustrated in Fig. 8, is radially disposed in the container 28a within the radius of the circumferentially located fasteners 92 which extend through the cover 46a into the container 28a in Fig. 7 to insure that the liquid will not leak through the openings provided in the cover 46a to receive the fasteners 92.

A second O ring seal 98a is provided in the top of the cover 46a adjacent the center opening in order to insure that there will be no leakage through the space surrounding the detector cell 56a.

The operation of the first illustrated embodiment may be seen in Fig. 1 wherein the discharge water 14 from the cooling tower falls into the sump 12 where it surrounds the monitoring apparatus. This water enters the ducts 44 for passage to the recess 32 in the container 28 where it passes along the annular inner passageway 58 and so comes into contact with the detector cell 56. The water then passes from the annular passageway 58 to the ducts 60 to the annular outer passageway 30 where it passes through openings 17 in the outlet conduit 16 to the sewerage system. As the water passes the detector cell 56 it will cause the gas therein to ionize and effect the pulses already described thereby monitoring the concentration of radioactive isotopes in the water effluent. The operation of the second embodiment shown in Fig. 7 is similar except that the water effluent is forced under pressure through the passageway 42a to the annular passageway 58a, past the detector cell 56a and then is discharged through the second passageway 94, thereby providing the radioactive isotopic concentration measurements already described.

It is a unique feature of the present invention to give the foregoing structural embodiments a wider range and scope of application by providing additional means to permit the existing structures to determine the energy distribution of the beta particles existing in the effluent and also to adapt the apparatus for operation for a specific isotope and specific isotope concentration. In addition, it is also possible to provide means to discriminate the beta disintegrations from the gamma for those isotopes which are gamma emitters only. The beta energy distribution is obtained by the use of suitable liners in the chamber to reduce or increase the path length the beta particles must travel to the detector. Operation to detect a specific isotope and isotope concentration is accomplished by the use of suitable liners to increase or decrease the path length the beta particles must travel to the detector and also to increase or decrease the counting volume of liquid passing through the chamber.

Specifically, the determination of the energy distribution of the beta particles in the effluent is accomplished, as can be seen in Figs. 3 and 7, by a suitable liner or liners 100 inserted in the annular passageway 58 and 58a, which liners will abut the inner wall 34 and 34a, thereby decreasing the cross-sectional area of the inner passageway and consequently decreasing the volume of the inner passageway and the volume of liquid that may fill and flow through the inner passageway. It follows that when the counting volume is decreased or increased the counting rate issuing from the detector is decreased or increased dependent upon the energy spectrum of the particular isotope.

Figure 10:
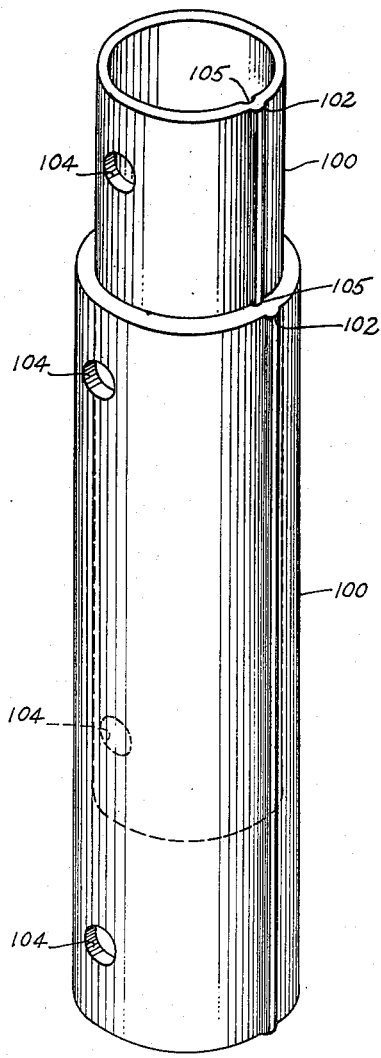
Fig. 10 is a perspective view of internesting liners of the present invention.

The cylindrical liners 100, as can be seen in Fig. 10, are provided with suitable openings 104 so that when the liner is in place the passageways 42 and 42a will be continuous. The liners 100 are correctly positioned by the guide 102 axially arranged on the outer periphery of such liner which will fit into the guideway 104 in the inner wall 34 and 34a, as seen in Figs. 3 and 7. When it is necessary to further reduce the counting rate volume, a second liner may be set into the recess 32 and 32a which will abut and be correctly guided therein by the first liner as described above. Thus, it can be seen that the counting rate volume may be varied by inserting or removing a series of internesting liners 100, thereby allowing the use of a single detector cell 56 and 56a for the entire energy spectrum of radio-active isotopic concentrations in the effluent.

Figure 11:
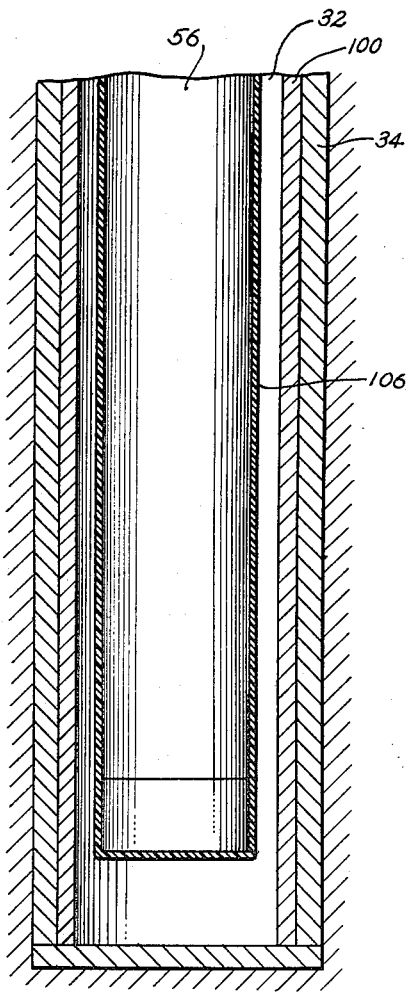
Fig. 11 is an elevational section of the liners and filter of the present invention.

Further, the discrimination of beta disintegrations from the gamma so as to measure gamma radiation only is accomplished by a suitable filter of plastic or the like 106 circumscribing the detector cell 56 and 56a as can be seen in Fig. 11, and which lies adjacent such detector cell over its entire length. Thus if the counting volume is contained beyond the maximum path length of a particular beta particle by reason of the filter 106 surrounding the detector cell 56 and 56a, such particles will not be counted by the detector cell and so discriminating against this particle. The detector cell 56 and 56a will then be sensitive only to beta particles having a longer path length, which too may be discriminated by the addition of a second filter 106, and the gamma radiation contained in the counting volume.

Further it can be seen that all elements of the monitoring apparatus are simply and easily removed and freely interchanged. For example, considering Fig. 2, the detector cell 56 may be removed from the recess 32 by lifting the cover 46 off the container 28 which carries the detector cell with it. The detector cell 56 is then slipped out of the cover 46 and the filter 106 affixed to such detector cell or a new detector cell inserted and all are then returned to the original position.

With the cover 46 and detector cell 56 removed, one or all of the liners 100 may be inserted into or removed from the recess 32 and again the cover and detector cell are replaced.

While the preferred embodiments of the invention are illustrated here, it is obvious many modifications may be made without departing from the intended scope of the invention wherein what I claim is:

1. In a monitoring apparatus for beta-gamma measurements of effluents from nuclear reactors, a housing having a discharge conduit, a bypass connected with said discharge and a valve controlling said bypass, a tubular container concentrically positioned in said housing and spaced therefrom to provide an outer receptacle, a filler of shielding material in said tubular container, said filler being formed with an elongated concentric recess defining an inner chamber, lining means in said recess, a radiation detector cell concentrically positioned in said recess, first ducts connecting the outside of the housing with the inner chamber for the passage of the effluents, second ducts spaced from the first ducts for conducting the effluents from the inner chamber to the outer chamber for discharge therefrom through the discharge conduit, a count-rate meter in circuit with said cell, and a second circuit connecting said count-rate meter and said valve for actuating the same.

2. In a monitoring apparatus for radiation measurement of radioactive fluid used in nuclear reactors, a chamber having inlet and discharge ports for flowing the fluid therethrough, a radiation detector having a sensitive cell positioned in and spaced from the walls defining said chamber, and at least one removable liner interposed between said wall and said sensitive cell.

3. In a monitoring apparatus for radiation measurement of radioactive fluid used in nuclear reactors, a chamber having fixed walls and inlet and discharge ports for flowing the fluid therethrough, a radiation detector having its sensitive cell positioned in and spaced from said walls and at least one removable liner interposed adjacent said walls and spaced from said sensitive cell and adapted for replacement by interchangeable liners of various thicknesses.

4. In a monitoring apparatus for radiation measurement of radioactive fluid used in nuclear reactor assemblies, a chamber having an inlet and an outlet port for flowing the fluid therethrough, a radiation detector having a sensitive cell positioned in and spaced from the wall defining said chamber, and an insert forming a liner for the chamber wall, said liner being removable for replacement by at least one of a plurality of selective interfitting liners which change the chamber capacity.

5. The structure of claim 4 characterized in that the interfitting liners include ports for the circulation of the fluid about the cell and means are provided for indicating the position of the liners during insertion.

6. The structure of claim 4 characterized in that the chamber containing the sensitive cell is positioned in an outer chamber which receives the discharge of fluid passing about the sensitive cell and shielding is provided for the chamber containing the sensitive cell.

7. In a monitoring apparatus for beta-gamma measurements of effluents from nuclear reactors, a housing having a discharge conduit, a bypass connected with said discharge and a valve controlling said bypass, a tubular container concentrically positioned in said housing and spaced therefrom to provide and outer receptacle, a filler of shielding material in said tubular container, said filler being formed with an elongated concentric recess defining an inner chamber, interchangeable lining means for said inner wall in said recess, a radiation detector cell concentrically positioned in said recess, first ducts connecting the outside of the housing with the inner chamber for the passage of the effluents, second ducts spaced from the first ducts for conducting the effluents from the inner chamber to the outer chamber for discharge therefrom through the discharge conduit, a count-rate meter in circuit with said cell, and a second circuit connecting said count-rate meter and said valve for actuating the same.

8. In a monitoring apparatus for radiation measurement of radioactive fluid used in nuclear reactor assemblies, a chamber having an inlet and an outlet port for flowing the fluid therethrough, a radiation detector having its sensitive cell positioned in and spaced from the wall defining said chamber, an insert forming a liner for the chamber wall, said liner being removable for replacement by at least one of a plurality of selective interfitting liners which change the chamber capacity, a beta particle filter for enclosing said sensitive cell, and means for directing said fluid flow between said insert and said filter.

9. In a monitoring apparatus for radiation measurement of radioactive fluid, a chamber having fixed walls, inlet and discharge ports in said walls for continuously flowing a fluid through said chamber, a radiation detector having a sensitive cell position in and spaced from said walls, means for directing said fluid into contact with said sensitive cell, and removable liner means interposed adjacent said wall and spaced from said sensitive cell.

10. The structure of claim 4 wherein the sensitive cell positioned in and spaced from the wall defining the chamber includes means for testing the sensitivity of the monitoring apparatus and shielding normally isolating said last named means from the fluid in said chamber and from said sensitive cell.

References Cited in the file of this patent

UNITED STATES PATENTS

| | | |
|---|---|---|
| 2,598,215 | Barkowski et al. | May 27, 1952 |
| 2,599,922 | Kanne | June 10, 1952 |
| 2,625,657 | Kanne | Jan. 13, 1953 |
| 2,666,857 | McLaren et al. | Jan. 19, 1954 |
| 2,715,684 | Schwarz | Aug. 16, 1955 |
| 2,727,154 | Goldsworthy | Dec. 13, 1955 |
| 2,738,426 | Hurst | Mar. 13, 1956 |
| 2,755,391 | Keys | July 17, 1956 |

OTHER REFERENCES

"A Beta-Gamma Monitor for Liquid Streams," article in A.E.C. Research and Development Report DP-177, by E. C. Wingfield; Instrument Development Division, September 1956.